United States Patent
Klahn et al.

(10) Patent No.: US 10,204,710 B2
(45) Date of Patent: Feb. 12, 2019

(54) METHOD AND DEVICE FOR REPLACING CONTROL ROD DRIVES

(71) Applicant: AREVA Inc., Lynchburg, VA (US)

(72) Inventors: Kurt David Klahn, Huddleston, VA (US); Patrick Gruenewald, Lynchburg, VA (US); Dorian Tim Lambert, South Shore, KY (US)

(73) Assignee: Framatome Inc., Lynchburg, VA (US)

( * ) Notice: Subject to any disclaimer, the term of this patent is extended or adjusted under 35 U.S.C. 154(b) by 514 days.

(21) Appl. No.: 14/842,441

(22) Filed: Sep. 1, 2015

(65) Prior Publication Data
US 2017/0352439 A1    Dec. 7, 2017

(51) Int. Cl.
| | |
|---|---|
| *G21C 19/20* | (2006.01) |
| *G21C 7/12* | (2006.01) |
| *G21C 19/26* | (2006.01) |
| *G21C 19/10* | (2006.01) |

(52) U.S. Cl.
CPC ............. *G21C 7/12* (2013.01); *G21C 19/207* (2013.01); *G21C 19/26* (2013.01); *G21C 19/10* (2013.01); *G21Y 2002/202* (2013.01); *G21Y 2002/501* (2013.01); *G21Y 2004/30* (2013.01); *G21Y 2004/40* (2013.01)

(58) Field of Classification Search
CPC ........ G21C 19/207; G21C 19/26; G21C 7/12; G21C 19/10
USPC .......................................... 376/260
See application file for complete search history.

(56) References Cited

U.S. PATENT DOCUMENTS

| | | | |
|---|---|---|---|
| 4,158,600 A | 6/1979 | Akimoto et al. | |
| 4,288,290 A | 9/1981 | Saima et al. | |
| 4,292,133 A | 9/1981 | Sasaki et al. | |
| 4,728,484 A | 3/1988 | Kodama et al. | |
| 4,801,422 A | 1/1989 | Turner et al. | |
| 4,973,443 A | 11/1990 | Larson et al. | |
| 5,019,325 A | 3/1991 | Larson et al. | |
| 5,169,593 A | 12/1992 | Kazirskis et al. | |
| 5,784,426 A | 6/1998 | Burner et al. | |
| 6,773,219 B2 | 8/2004 | Burner | |
| 7,809,098 B2 | 10/2010 | Salazar et al. | |
| 8,634,513 B2 | 1/2014 | Ketcham et al. | |
| 2009/0067564 A1* | 3/2009 | Salazar ............... | G21C 19/207 376/260 |

* cited by examiner

*Primary Examiner* — Jack W Keith
*Assistant Examiner* — Daniel Wasil
(74) *Attorney, Agent, or Firm* — Davidson, Davidson & Kappel, LLC (57) ABSTRACT

A control rod drive replacement device includes a channel for mounting on a support under a nuclear reactor pressure vessel and a control rod drive extractor removably received in the channel. The control rod drive extractor includes a base and a housing pivotably connected to the base. The housing is configured for receiving a control rod drive. The base includes a base axis. The housing is pivotably attached to the base at the base axis for pivoting between a horizontal orientation in which the housing is aligned within the channel and a vertical orientation in which the housing is aligned for receiving the control rod drive from the nuclear reactor pressure vessel. The housing is vertically movable with respect to the base in the vertical orientation.

20 Claims, 13 Drawing Sheets

METHOD AND DEVICE FOR REPLACING CONTROL ROD DRIVES

The present disclosure relates generally to servicing nuclear reactors during outages and more specifically to a method and device for replacing control rod drives.

BACKGROUND

Currently, machines for under-vessel activities in light water reactors during refueling outages require the crew to remove a control rod drive (CRD) using a mast, transport the mast with the CRD from under the pressure vessel, exchange the removed CRD for a new CRD, and then return the mast under the pressure vessel for insertion of the new CRD.

SUMMARY OF THE INVENTION

A control rod drive removal device is provided. The control rod drive replacement device includes a first channel for mounting on a support under a nuclear reactor pressure vessel; a first control rod drive extractor removably received in the first channel, the first control rod drive extractor including a first housing configured for receiving a first control rod drive, the first housing being movable between a horizontal orientation in which the first housing is aligned within the first channel and a vertical orientation in which the first housing is aligned for receiving the first control rod drive from the nuclear reactor pressure vessel; a second channel connected on top of the first channel under the nuclear reactor pressure vessel; and a second control rod drive extractor removably received in the second channel, the second control rod drive extractor including a second housing configured for receiving a second control rod drive, the second housing being movable between a horizontal orientation in which the second housing is aligned within the second channel and a vertical orientation in which the second housing is aligned for receiving the second control rod drive from the nuclear reactor pressure vessel.

A method of replacing a control rod drive is also provided. The method includes providing a first channel onto a support below the nuclear reactor pressure vessel and a second channel connected to the first channel; movably mounting a first housing inside the first channel; moving the first housing from a horizontal orientation in which the first housing is aligned within the first channel to a vertical orientation; receiving a first control rod drive within the first housing while the first housing is in the vertical orientation; moving the first housing from the vertical orientation to the horizontal orientation while the first control rod drive is within the first housing; removing the first housing with the first control rod drive from the first channel; movably mounting a second housing including a replacement control rod drive therein inside the second channel; moving the second housing and the replacement control rod drive from a horizontal orientation to a vertical orientation; and providing the replacement control rod drive from the second housing into the nuclear reactor pressure vessel while the second housing is in the vertical orientation.

A further aspect of the invention includes a control rod drive replacement device including a channel for mounting on a support under a nuclear reactor pressure vessel; and a control rod drive extractor removably received in the channel, the control rod drive extractor including a base and a housing pivotably connected to the base, the housing configured for receiving a control rod drive, the base including a base axis, the housing being pivotably attached to the base at the base for pivoting between a horizontal orientation in which the housing is aligned within the channel and a vertical orientation in which the housing is aligned for receiving the control rod drive from the nuclear reactor pressure vessel, the housing being vertically movable with respect to the base in the vertical orientation.

Another further aspect of the invention includes a control rod drive replacement device including a channel for mounting on a support under a nuclear reactor pressure vessel; a control rod drive extractor removably received in the channel, the control drive extractor including a housing for receiving a control rod drive; and an extension ramp coupled to an axial end of the channel. The extension ramp is configured for selectively bridging a gap between a leveling tray arranged for at least one of removing the housing and the control rod drive from the channel and supplying the first housing and a new first control rod drive to the channel. In one embodiment, the control rod drive replacement device may also include an additional channel mounted on top of the channel; and an additional control rod drive extractor removably received in the additional channel, the control drive extractor including an additional housing for receiving an additional control rod drive. The leveling tray may be being arranged for at least one of removing the additional housing and the additional control rod drive from the additional channel and supplying the additional housing and a new additional control rod drive to the additional channel. The extension ramp may be removable coupled at the axial end of the channel for manual removal, may be slidably coupled at the axial end of the channel or may be rotatably coupled at the axial end of the channel.

BRIEF DESCRIPTION OF THE DRAWINGS

The present invention is described below by reference to the following drawings, in which:

FIG. 7a provides a perspective view and FIG. 7b provides a top plan view illustrating the upper mast assembly housing a CRD therein;

DETAILED DESCRIPTION

The present disclosure provides a method and device for replacing control rod drives in a reactor pressure vessel. In particularly, the method and device are intended to allow for rapid replacement of CRDs in a Boiling Water Reactor (BWR) during a normal refueling outage. The method and device may significantly decrease the time associated with under-vessel activities, leading to decreases in cost and associated dose.

Figure 1:
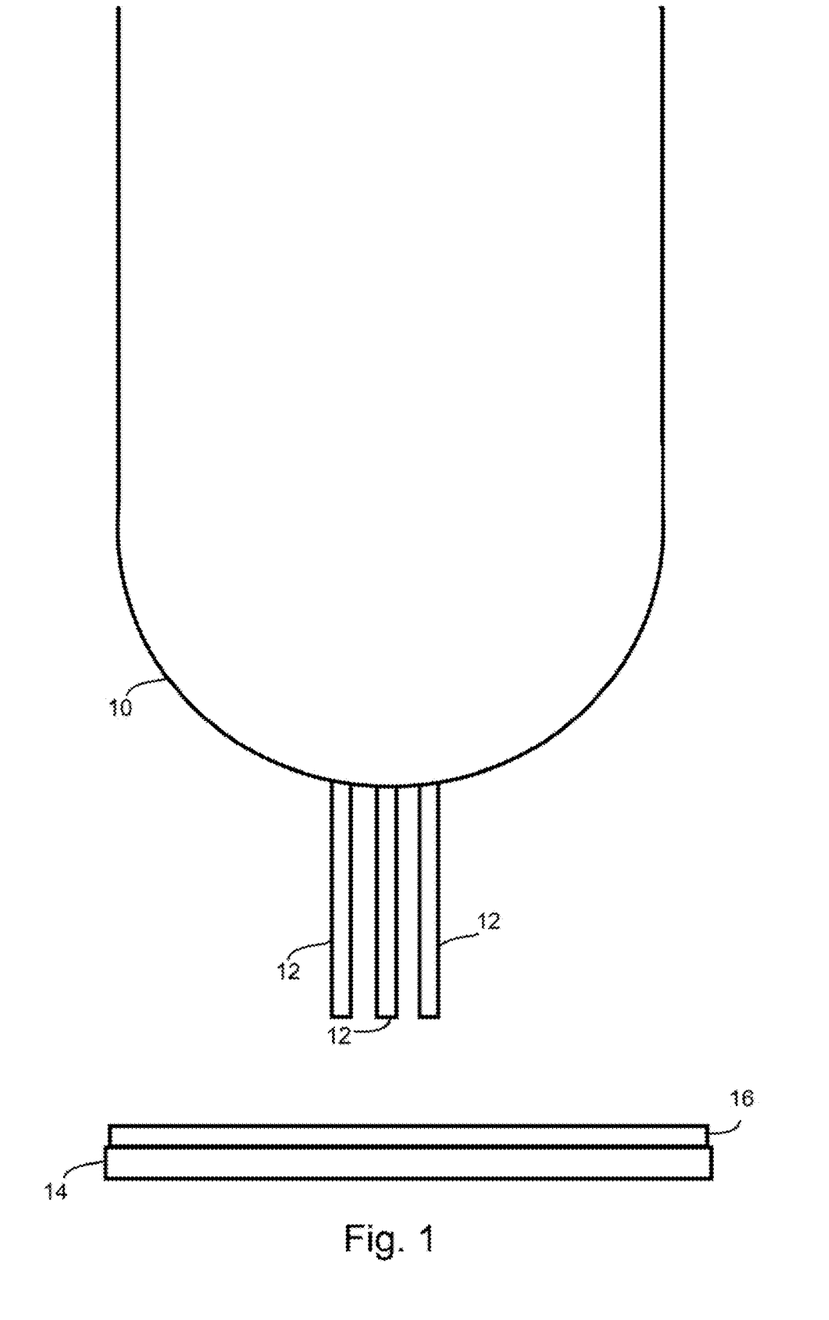
FIG. 1 schematically shows a nuclear reactor pressure vessel of a BWR including a plurality of CRDs extending downward from pressure vessel.

FIG. 1 schematically shows a nuclear reactor pressure vessel 10 of a BWR including a plurality of CRDs 12 extending downward from pressure vessel 10. Under pressure vessel 10 and CRDs 12, a support in the form of a carousel 14 is provided. In accordance with an embodiment of the present invention, carousel 14 is provided with a schematically shown control rod drive replacement device 16 for removing CRDs 12 and replacing CRDs 12 with replacement CRDs. The components of replacement device 16, including two channels 24, 36 and two control rod drive extractors 48, 102, and the method for operating replacement device 16 are shown in greater detail in FIGS. 3 to 21 and discussed below.

Figure 2:
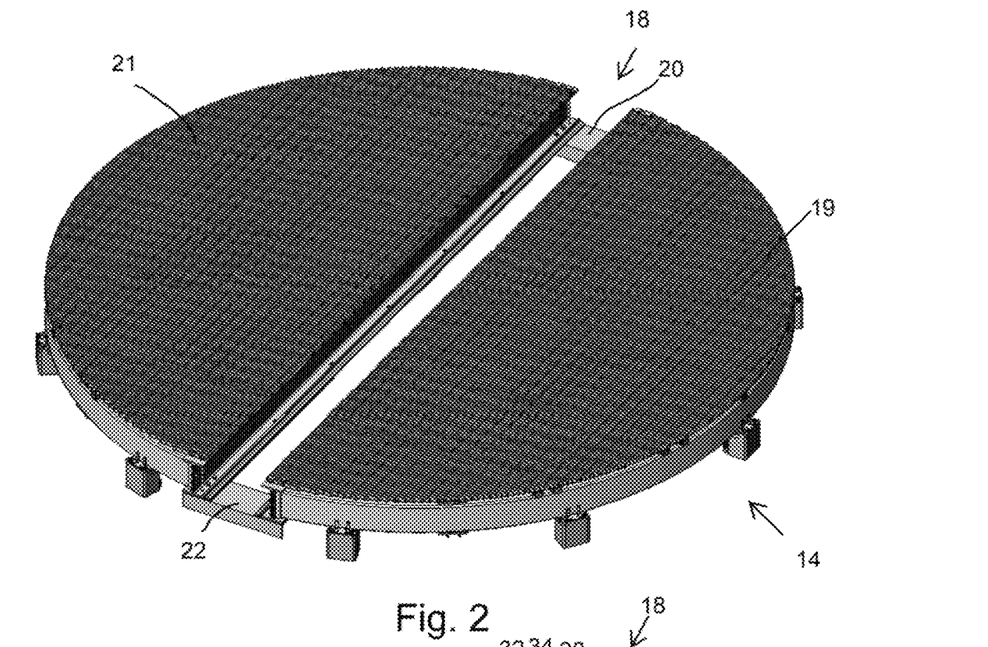
FIG. 2 shows a perspective view of a carousel shown in FIG. 1.

FIG. 2 shows a perspective view of carousel 14. Carousel 14 is circular in shape and includes a cutout 18 formed therein bisecting carousel 14 into two equal sections 19, 21. Sections 19 are connected together by two support beams 20, 22 provided near an outer circumference of carousel 14 at cutout 18.

Figure 3:
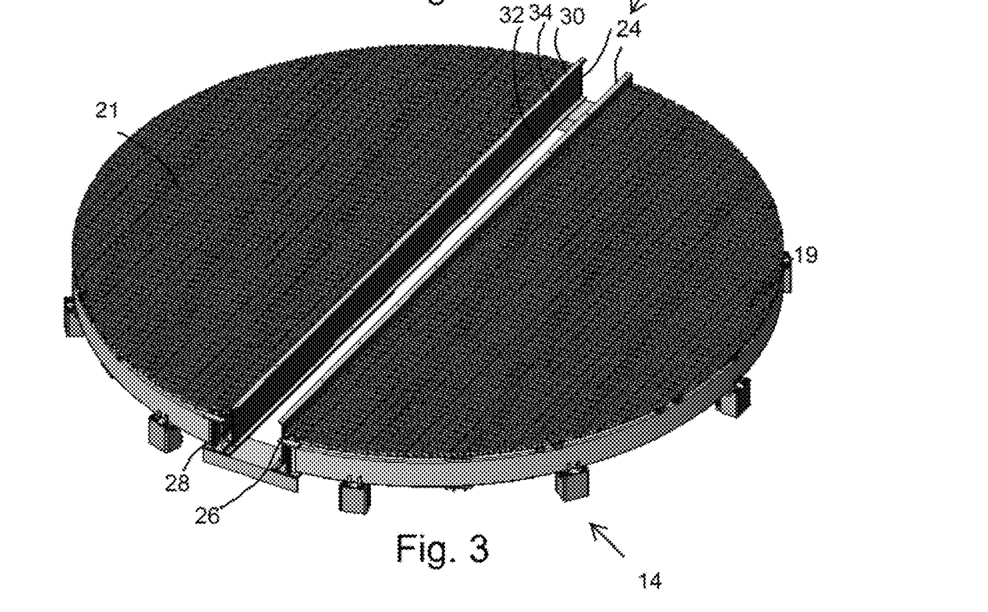
FIG. 3 shows a perspective view of the carousel with a lower channel of a CRD removal device installed on the carousel.

FIG. 3 shows a perspective view of carousel 14 with a lower channel 24 of replacement device 16 (FIG. 1) installed on carousel 14. Lower channel 24 is provided inside cutout 18 and rests on upper surfaces of support beams 20, 22. Lower channel 24 includes a first section 26 for contacting section 19 of carousel 14 inside cutout 18 and a second section 28 opposite first section 26 for contacting section 21 of carousel 14 inside cutout 18. Each section 26, 28 includes an upper track 30 and a lower track 32 that are connected by a vertical wall 34. Laterally between walls 34 of sections 26, 28, a space is provided for receiving a lower mast assembly 102 (FIGS. 13 to 20).

Figure 4:
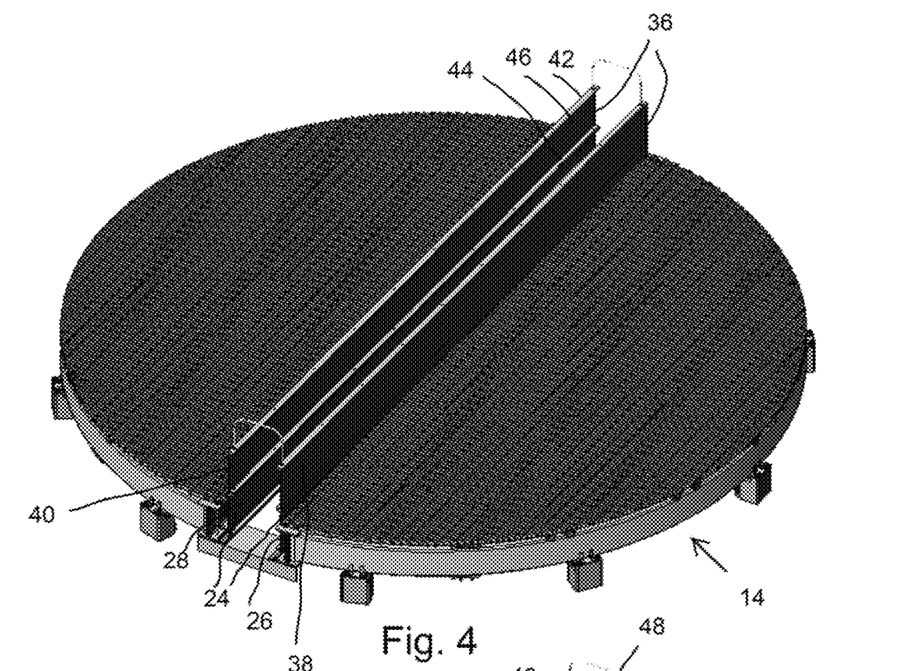
FIG. 4 shows a perspective view of the carousel with an upper channel of the CRD removal device installed on the carousel on top of the lower channel.

FIG. 4 shows a perspective view of carousel 14 with an upper channel 36 of removal device 16 installed on carousel 14 on top of lower channel 24. Upper channel 36 includes a first section 38 for contacting first section 26 of lower channel 24 and a second section 40 opposite first section 38 for contacting second section 28 of lower channel 24. Similar to lower channel 24, each section 38, 40 includes an upper track 42 and a lower track 44 that are connected by a vertical wall 46.

Figure 5:
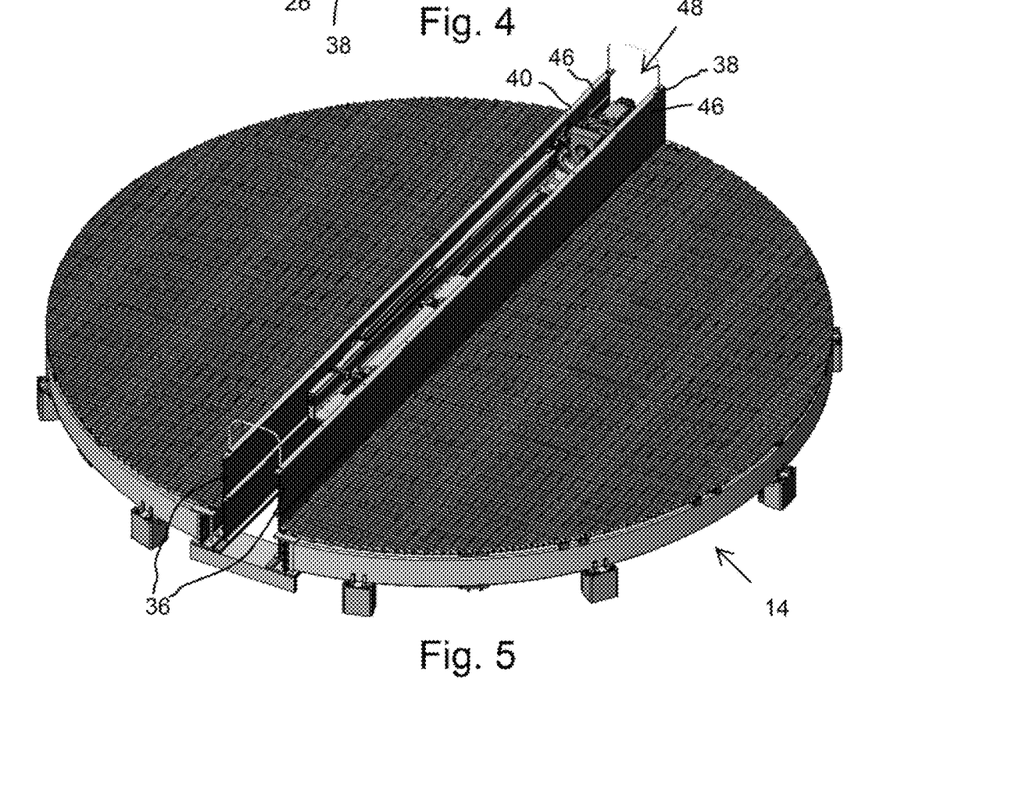
FIG. 5 shows a perspective view of the carousel with an upper mast assembly being received in the upper channel.

FIG. 5 shows a perspective view of carousel 14 with an upper CRD extractor 48, which is configured as a mast assembly, being received in upper channel 36 laterally between walls 46 of sections 38, 40.

Figure 6A:
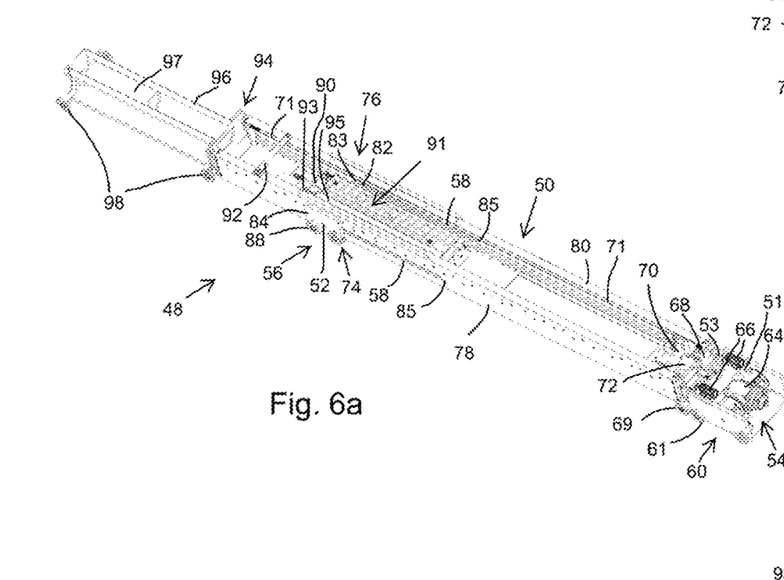
FIG. 6a provides a perspective view and FIG. 6b provides a top plan view illustrating the upper mast assembly removed from the upper channel.
Figure 6B:
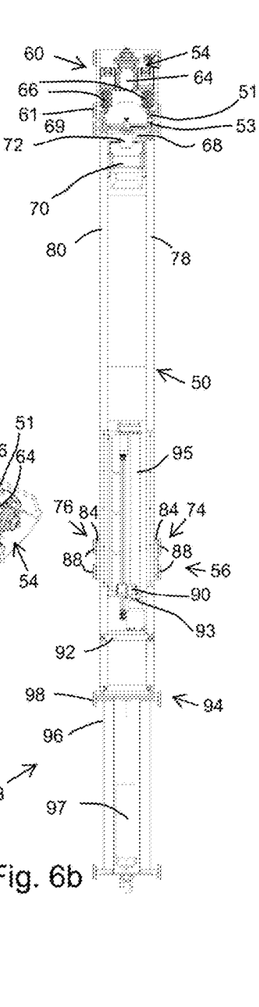

FIGS. 6a and 6b illustrate upper mast assembly 48 removed from upper channel 36 and provide a clearer view of upper mast assembly 48. FIG. 6a provides a perspective view, while FIG. 6b provides a top plan view. Referring to FIGS. 6a and 6b together with FIGS. 8 to 13, upper mast assembly 48 includes an upper CRD housing 50, which is configured as a hollow mast for receiving a CRD, pivotably attached to upper channel 36 (FIGS. 4 to 5, 8 to 13) at an upper base axis 52 and a upper actuator 54 for pivoting upper mast 50 about upper base axis 52 between a horizontal orientation, as shown for example in FIGS. 8, 12 and 13, in which upper mast 50 is aligned within upper channel 36 (FIGS. 8 and 12 to 13) and a vertical orientation, as shown for example in FIGS. 9 to 11, in which upper mast 50 is aligned for extracting a CRD from the nuclear reactor pressure vessel. Advantageously, upper mast assembly 48 is also arranged and configured such that upper mast 50 is upwardly vertically movable with respect to upper base axis 52, as discussed further below with respect to FIG. 10.

Figure 8:
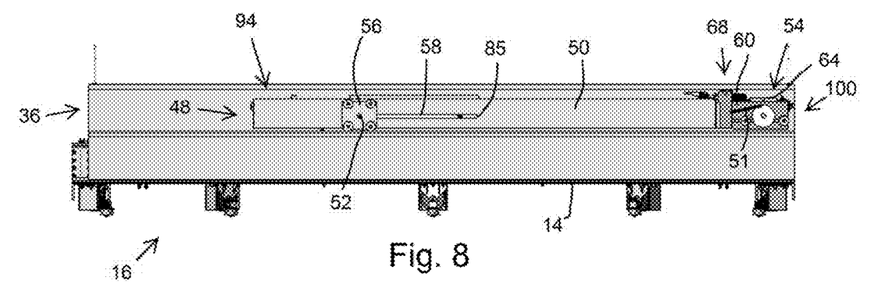
FIGS. 8 to 21 illustrate the operation of the CRD removal device according to the exemplary embodiment of the invention.

More specifically, referring to FIGS. 6a and 6b, upper mast assembly 48 includes a base, which is formed by an upper trunnion assembly 56, interacting with an upper elongated slot 58 formed in upper mast 50 to allow upper mast 50 to pivot about upper base axis 52 and allow upper mast 50 to be moved upwardly vertical in the vertical orientation. Upper actuator 54 is supported by a cart 60 positioned for linear horizontal movement within upper channel 36 (FIGS. 4, 5, 8 to 13). To allow for such movement, cart 60 includes a plurality of wheels 61 for sliding along tracks 44 of sections 38, 40 (FIG. 4) of upper channel 36 (FIGS. 3 to 5, 8 to 13). As shown in FIG. 8, when upper mast 50 is in the horizontal orientation, cart 60 is positioned at a longitudinal end 100 of upper channel 36.

Referring to FIGS. 6a and 6b, in this embodiment, actuator 54 is in the form of a winch 64 positioned in an interior thereof for actuating a pair of winch cables 51 for pivoting upper mast 50 and for moving upper mast 50 vertically when upper mast 50 is in the vertical orientation. Cables 51 extend from winch 64 and each are attached to a longitudinal end 68 of mast 50 by a respective clevis 53. Winch 64 controls the movement of upper mast 50 between the horizontal and vertical orientations by either letting out or pulling in the cables 51. The action of letting out the cable 51 allows the mast to pivot to pivot from the horizontal orientation to the vertical orientation. The reverse act of pulling in the cable 51 transfers upper mast 50 from the vertical orientation to the horizontal orientation. Mast 50 is pulled vertically upward in the vertical orientation by winch 64 pulling in cables 51.

Cart 60 also supports a pair of clamps 66 for gripping mast 50 when mast 50 is in the vertical orientation to restrict the mast 50 from pivoting about axis 52 when mast is receiving a CRD. Clamps 66 include rollers that slide along the surface of mast 50 when mast 50 is moved vertically, allowing clamps 66 to maintain the vertical orientation of mast 50, without mast 50 rotating about axis 52, as mast 50 is moved vertically. When mast 50 is to be moved from the vertical orientation into the horizontal orientation, clamps 66 release mast 50. Mast 50 is also provided with a set of wheels 69 at longitudinal end 68 for sliding along tracks 44 (FIG. 4) of upper channel 36 (FIGS. 4 to 5, 8 to 13) when mast is moved between the horizontal and vertical orientations. At longitudinal end 68, mast 50 includes a mast trolley 70 driven by dual lead screws 71 (FIG. 6a—only one being visible, as the other is blocked by wall 78) located on opposing sides of the trolley 70 to allow the trolley 70 to be uniformly drivable. Adjacent to mast trolley 70, mast assembly 48 further includes a lower CRD support 72 for supporting a lower longitudinal end of a CRD when the mast 50 is in the vertical orientation. Mast trolley 70 is movable away from lower CRD support 72 to receive a CRD when mast 50 is in the vertical orientation and is movable back toward lower CRD support 72 such that a bottom of the CRD contacts lower CRD support 72 before mast 50 is moved back into the horizontal orientation from the vertical orientation.

Upper trunnion assembly 56 includes two sections 74, 76, each being engaged with one of two longitudinally extending walls 78, 80 of mast 50. Walls 78, 80 are spaced from each other and define a space therebetween for receiving a CRD. Each trunnion section 74, 76 includes a protrusion 82 extending into a respective elongated slot 58 in walls 78, 80 and a vertically aligned base plate 84 from which the protrusion 82 protrudes. In the horizontal orientation, protrusions 82 each contact a first end stop edge 83 of slot 58.

As discussed further below, the second end stop edges 85 of slots 58 limit the upward vertical movement of mast 50 in the vertical orientation by contacting protrusions 82 at a peak vertical reach of upper mast 50. Attached to base plates 84, upper trunnion assembly 56 further includes a set of wheels 88 on both of sections 74, 76. Wheels 88 axially rest on and move along track 44 (FIG. 4) of channel 36 (FIGS. 3 to 5, 8 to 13) during the movement of mast 50 between the vertical and horizontal positions.

Adjacent to upper trunnion assembly 56, mast assembly 48 further includes an upper CRD support 90 and CRD support arms 92 for supporting a CRD received in mast 50 near a second longitudinal end 94 of mast opposite of first longitudinal end 68. Lower CRD support 72, upper CRD support 90, and the CRD support arms 92 constrain the CRD while mast 50 is rotating from the horizontal orientation to vertical orientation and while the mast is in its vertical orientation. Trolley 70 is unable to fully reach the CRD when trolley 70 is in its seated position. A lowering section 91 including a lead screw 93 and a motor 95 for moving lead screw 93 toward the CRD when mast 50 receives the CRD is used to support the CRD when lowering from the seated until the CRD can interface with the trolley 70 in the mast 50. Lowering section 91 is also used during subsequent insertion of the new CRD to return it to the seated position.

As shown in FIG. 8, Mast 50 is shorter than channel 36 and is for example approximately two feet shorter than the existing drive exchange masts. The reduced size of mast 50 and the ability of protrusions 82 to slide in slot 58 may aid in the prevention of damage to under-vessel instrumentation cables. Accordingly, mast assembly 48 may advantageously be used in a single-channel arrangement, instead of the double-channel arrangement described with respect to FIGS. 4, 5, 8 to 21 and 23a to 23c.

Figures 7A, 7B:
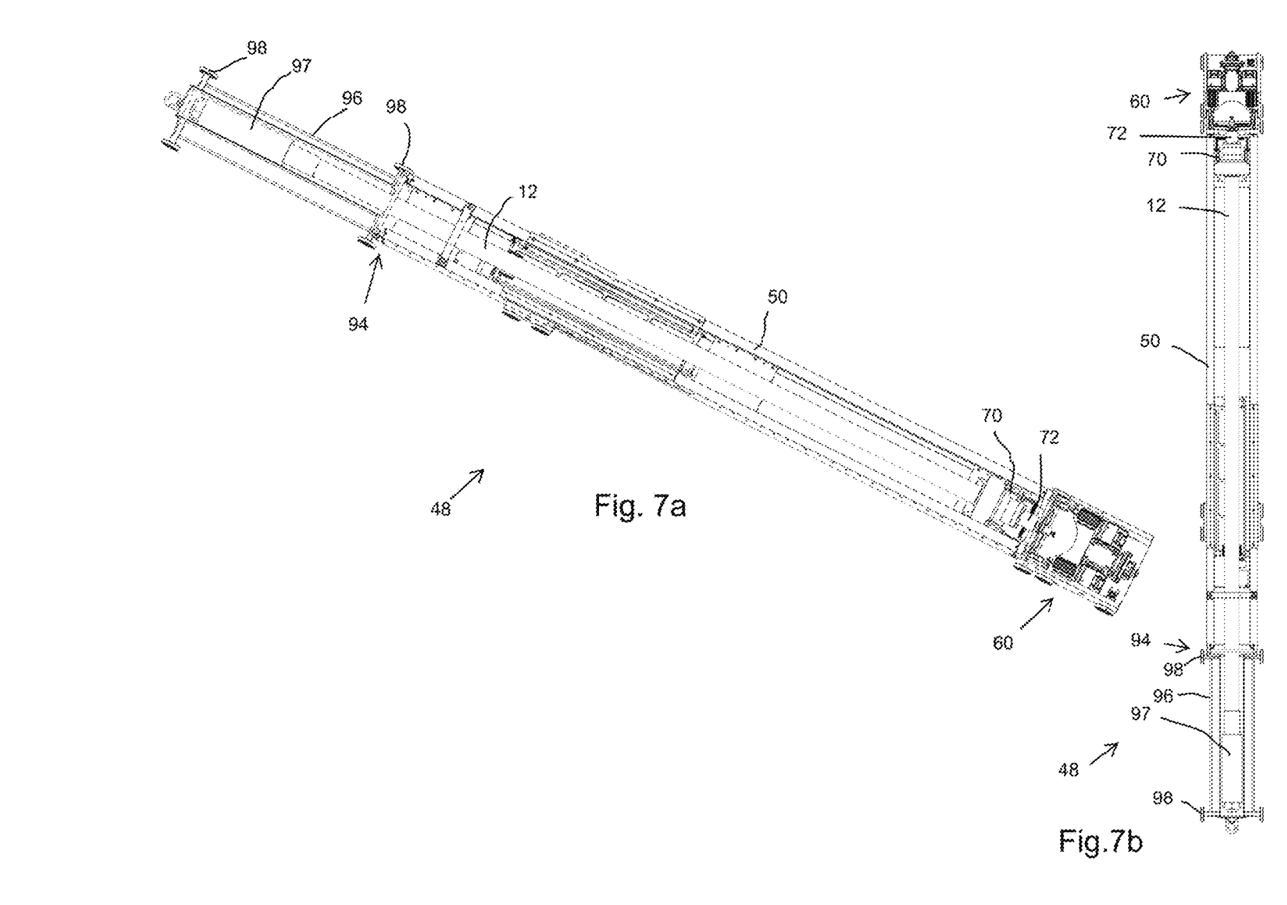

As shown in FIGS. 7a and 7b, which illustrate view of mast assembly 48 housing a CRD 12 within mast 50, due to the reduced size of mast 50, when CRD 12 is housed within mast 50, the CRD 12 protrudes from mast 50, making the CRD 12 vulnerable to damage. Accordingly, a mast extension 96 is provided at longitudinal end 94 to limit the dose the workers are exposed the CRD during transportation. Because a tip of the CRD is exposed to the highest dose, a radiation shield 97 is provided on the tip of the CRD in the mast extension 96. Radiation shield 97 is formed as a cylindrical cap to contour to the axial end and the outer cylindrical surface CRD 12. Radiation shield 97 is described further below with respect to FIGS. 22a and 22b. In the view shown in FIGS. 7a and 7b, as well as FIGS. 6a and 6b, mast extension 96 is removably attached to mast 50 at longitudinal end 94. Mast extension 96 may be attached to mast 50 after CRD 12 is received within mast 50 and moved to the horizontal orientation within channel 36 (FIGS. 4 to 5, 8 to 13). Mast extension 96 may be formed of radiation shielding material, or include additional such material, to reduce the dose exposure of the crew performing the task of removing the CRD 12 from control rod drive replacement device 16. Mast extension 96 includes a plurality of wheels 98 for sliding along tracks 44 (FIG. 4) as mast assembly 48 is extracted from channel 36 (FIGS. 4 to 5, 8 to 13) after receiving a CRD from the pressure vessel. Wheels 61, 69, 88, 98 allow for sliding in and out of upper channel along the leveling tray 132 (FIGS. 23a to 23c).

Figure 9:
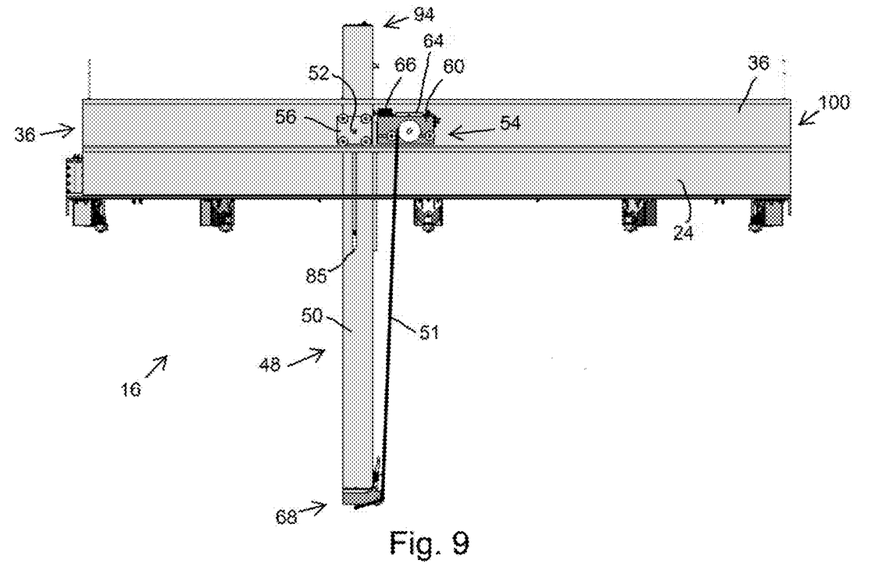

FIGS. 8 to 21 show the method of operating control rod drive replacement device 16, with certain details of replacement device 16 being shown schematically or omitted for ease of description. FIG. 8 shows replacement device 16 on carousel 14 with upper mast 50 in channel 36 in the horizontal orientation and FIG. 9 shows upper mast 50 in the vertical orientation. As noted above, to move upper mast from the horizontal orientation shown in FIG. 8 to the vertical orientation shown in FIG. 9, clamps 66 are disengaged from longitudinal end 68 of mast 50 and cables 51 are let out from winch 64, causing longitudinal end 68 to drop downward via gravity through the space in upper channel 36 and causing longitudinal end 94 to raise above channel 36 and towards CRDs 12 and pressure vessel 10 (FIG. 1). This movement involves mast 50 pivoting about axis 52, which is defined by protrusions 82 (FIG. 6a), while protrusions 82 remain in contact with first end stop edge 83 (FIGS. 6a, 6b and 10), which in the vertical position is the top end stop edge, of slot 58. During the pivoting, winch cart 60 slides away from a longitudinal end 100 of upper channel 36 to a longitudinal center of upper channel 36 and toward trunnion assembly 56. Once in the vertical position, cart 60 is oriented adjacent to mast 50 near trunnion assembly 56 and clamps 66 of cart 60 may grip mast 50 to maintain the vertical position. Although actuator 54 in this embodiment is formed by a single winch 64, in other embodiments actuator 54 may include two or more winches or other actuation devices. For example, one winch or actuation device may pivot mast 50 about axis 52 and another winch or actuation device may move mast 50 vertically upward.

Figure 10:
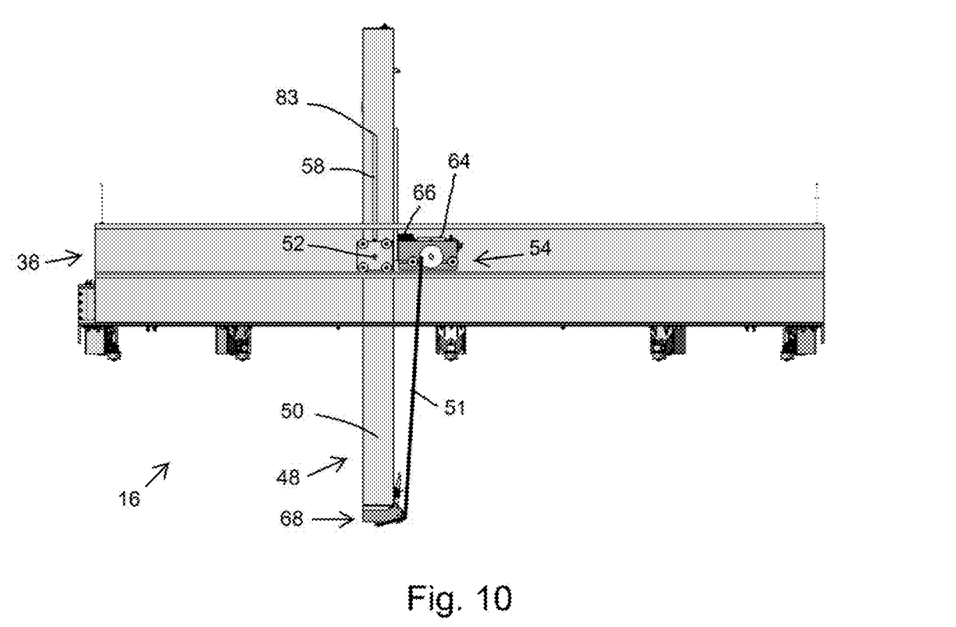

FIG. 10 shows replacement device 16 at a peak vertical reach of upper mast 50. Accordingly, between the position shown in FIG. 9, in which protrusions 82 (FIG. 6a) contact the first or top end stop edge 83 of slot 58 and upper mast 50 has a minimum vertical reach in the vertical position, and the position shown in FIG. 10, mast 50 has been moved vertically upward with respect to base axis 52 in the vertical orientation by pulling longitudinal end 68 upward via cables 51. More specifically, mast 50 has been raised by winch 64 vertically upwardly such that protrusions 82 (FIG. 6a) slide in slots 58 from contact with the top end stop edges 83 to contact with the second or bottom end stop edges 85 (FIG. 8, 9, 11). When in the top peak vertical reach or uppermost vertical position, mast 50 may receive a CRD 12 from pressure vessel 10 (FIG. 1).

Figure 11:
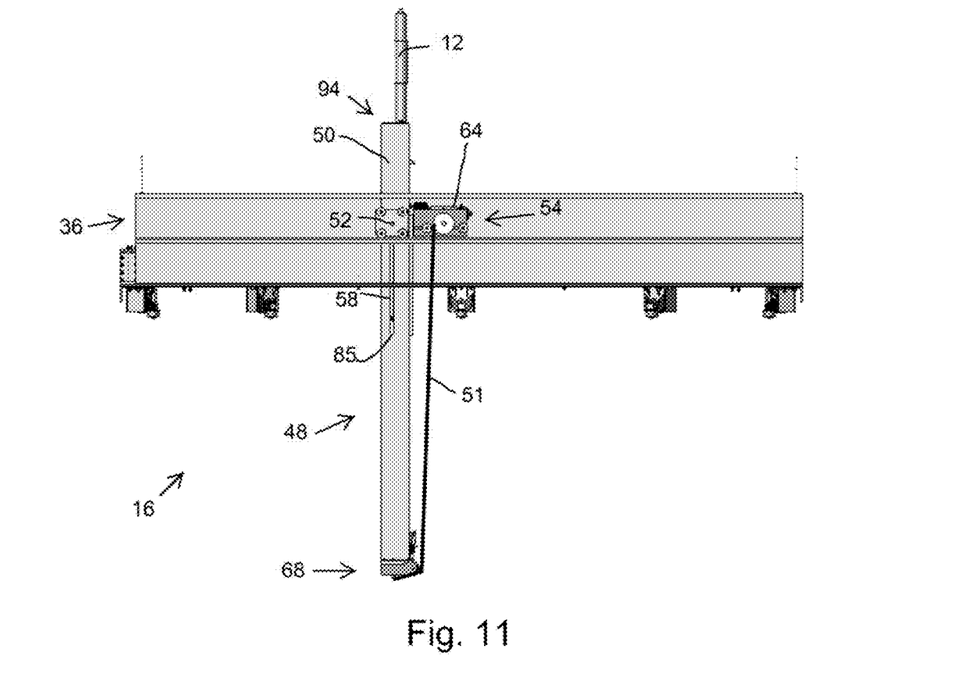

FIG. 11 shows replacement device 16 holding a CRD 12 in upper mast 50 in the minimum vertical reach position of upper mast 50. Accordingly, between the position shown in FIG. 10, in which protrusions 82 (FIG. 6a) contact with the second or bottom or end stop edges 85 of slot 58 and upper mast 50 is empty, and the position shown in FIG. 11, mast 50 has received a CRD 12 and been lowered by winch 64 vertically downwardly by letting out cables 51 such that protrusions 82 (FIG. 6a) slide in slots 58 from contact with the bottom end stop edges 85 to contact with the top end stop edges 83 (FIG. 10) of slot 58. As noted above, mast 50 is configured such that CRD 12 is longer than mast 50 and when mast 50 is holding CRD 12, a portion of CRD 12 protrudes past longitudinal end 94 of mast 50.

Figure 12:
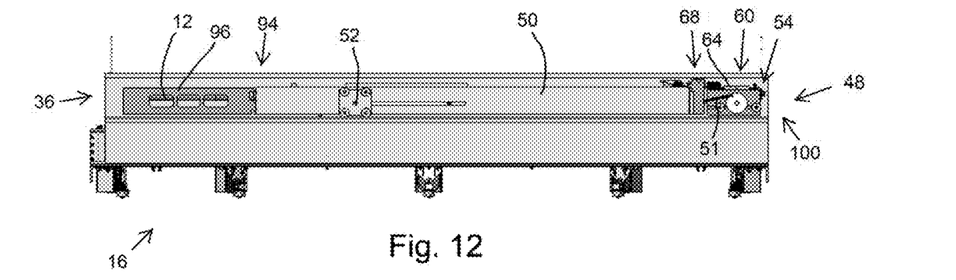

FIG. 12 shows replacement device 16 holding CRD 12 in upper mast 50 in the horizontal orientation inside channel 36 with mast extension 96 connected to longitudinal end 94 of mast 50. Mast extension 96 may be added manually by workers into channel 36 before the moving the mast 50 holding CRD 10 from the vertical orientation to the horizontal orientation or mast extension may be added into channel 36 before the mast 50 is moved from the initial horizontal orientation to the vertical orientation. Mast extension 96 is provided over the portion of CRD 12 protruding longitudinally past longitudinal end 94 of mast 50. Accordingly, between the position shown in FIG. 11 and the position shown in FIG. 12, winch 64 pulls in cables 51 so mast 50 is pivoted by winch 64 about axis 52 with protrusions 82 (FIG. 6a) in contact with end stop edges 83 (FIG. 10) of slot 58, and cart 60 has slid back over to longitudinal end 100 of channel 36 adjacent to longitudinal end 68 of mast.

Figure 13:
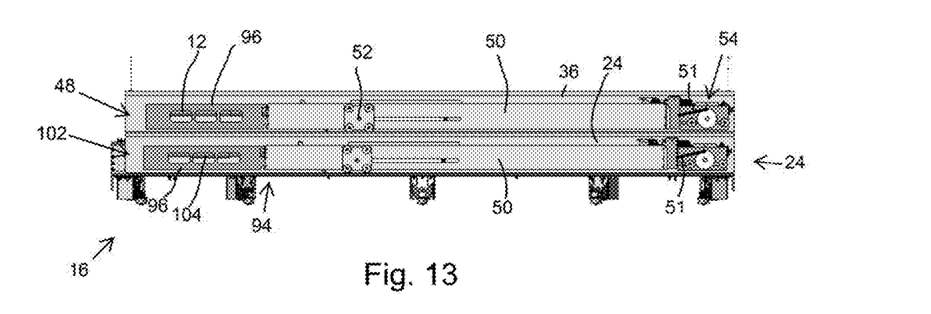

FIG. 13 shows a lower mast assembly 102 being received in lower channel 24, while upper mast assembly 48 remains in upper channel 36 holding the used CRD 12 extracted from pressure vessel 10 (FIG. 1). Lower mast assembly 102 is identical to upper mast assembly 48 and operates in the same manner as upper mast assembly 48. Accordingly, the same reference numbers will be used to describe the components of lower mast assembly 102 as used above with respect to upper mast assembly 48. Lower mast assembly 102 includes a lower mast 50 holding a new CRD 104 for replacing the CRD 12 removed from pressure vessel, with a mast extension 96 being provided at the longitudinal end 94 of the lower mast 50.

Figure 14:
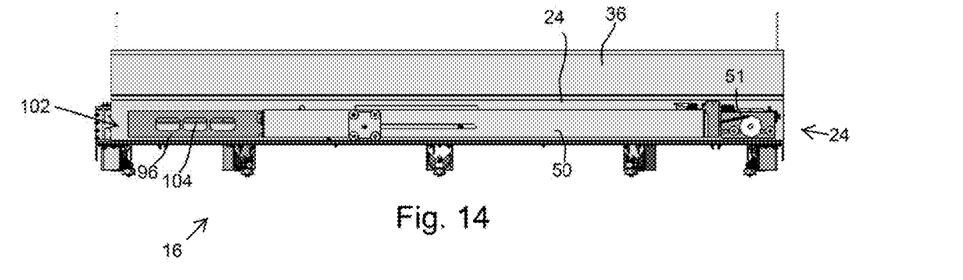

As shown in FIG. 14, upper mast assembly 48 (FIGS. 8 to 13) has been removed from upper channel 36 to dispose of the removed CRD held within upper mast assembly 48. Placing lower mast assembly 102 and the new CRD 104 in lower channel 24 before removing the used CRD 12 (FIGS. 11 to 13) from upper channel 36 allows both operations to be performed during a single trip by workers during a same time period—with the same set of workers bringing in the new CRD 104 in lower mast assembly 102 and leaving with old CRD 12 (FIGS. 11 to 13) in upper mast assembly 48—limiting the dose exposure of the workers below pressure vessel 10 (FIG. 1).

Figure 15:
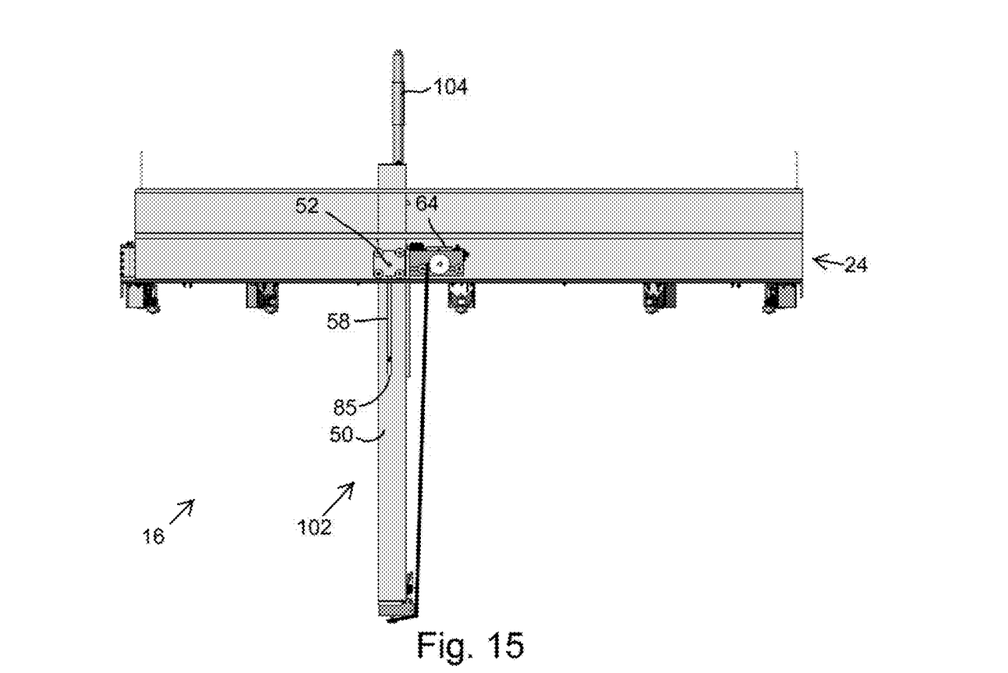

FIG. 15 shows lower mast 50 in the vertical position holding CRD 104 with mast extension 96 (FIGS. 13 and 14) removed. Mast extension 96 is removed before the rotation from the horizontal orientation to the vertical orientation to provide better clearance. In FIG. 15, protrusions 82 (FIG. 6a) contact the first or top end stop edge 83 (FIG. 10) of slot 58 and lower mast 50 has a minimum vertical reach in the vertical orientation.

Figure 16:
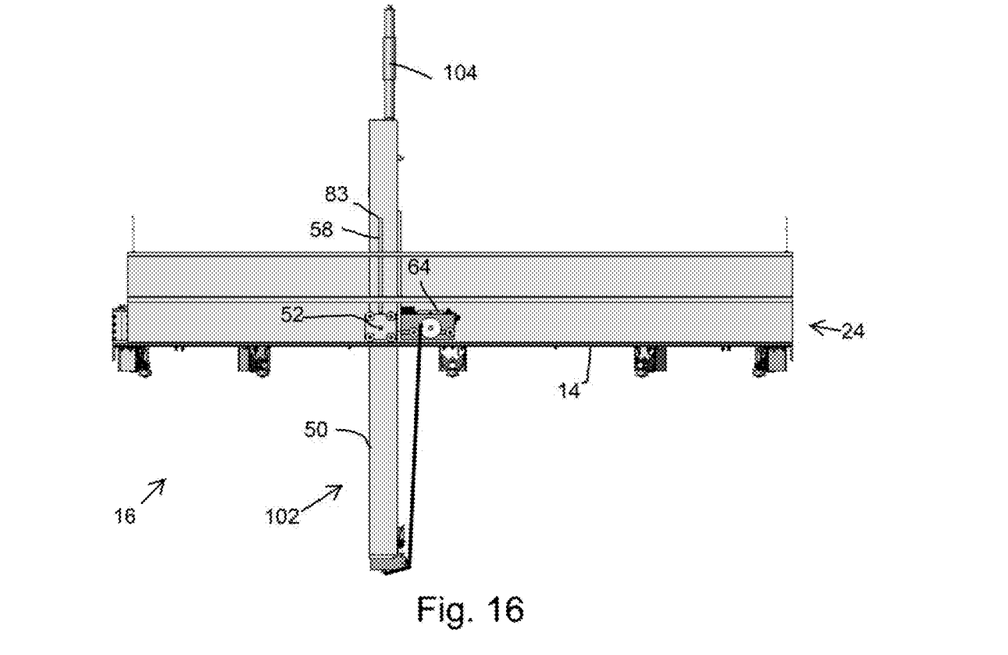
Figure 17:
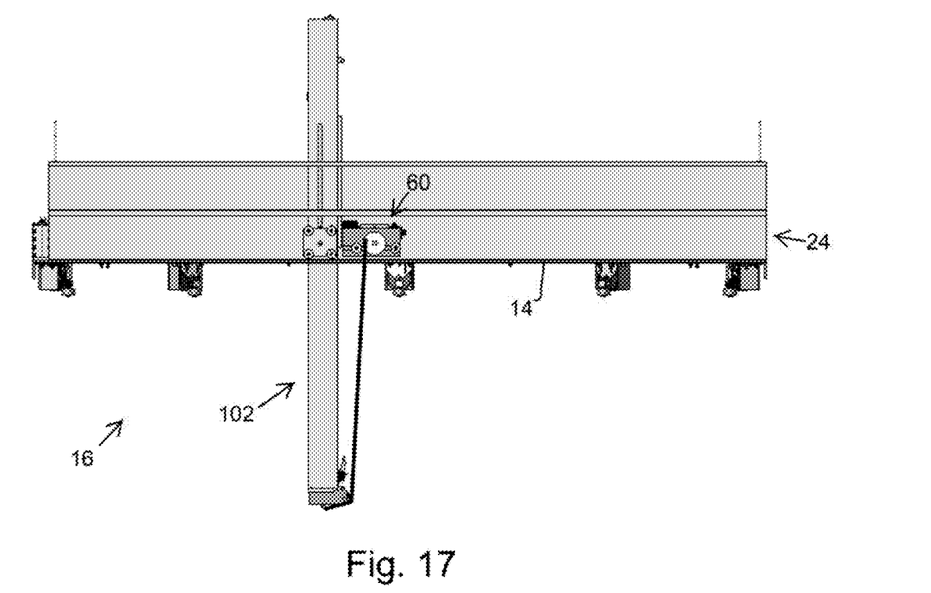
Figure 18:
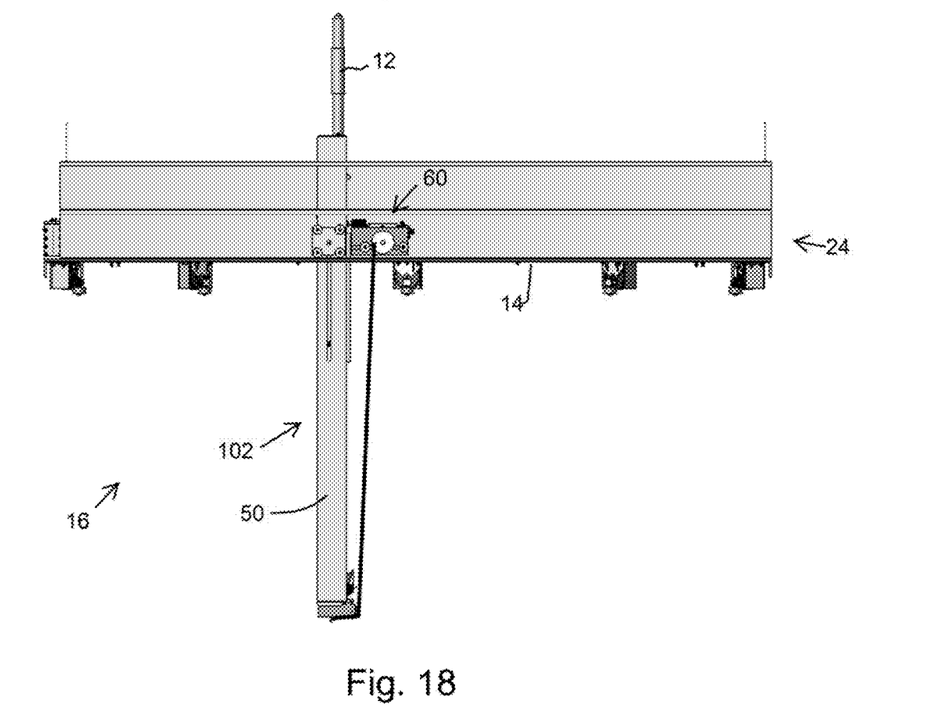
Figure 19:
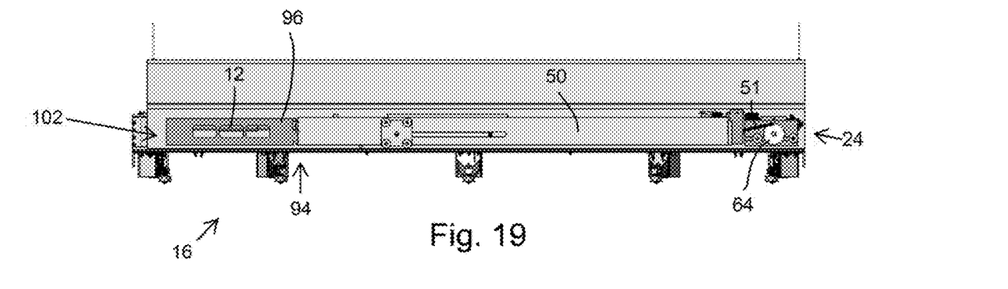

FIG. 16 shows replacement device 16 at a peak vertical reach of lower mast 50. Accordingly, between the position shown in FIG. 15 and the position shown in FIG. 16, mast 50 has been raised by winch 64 vertically upwardly by pulling in cables 51 such that protrusions 82 (FIG. 6a) slide in slots 58 from contact with the top end stop edges 83 to contact with the second or bottom or end stop edges 85 (FIG. 15). When in the top peak vertical reach or uppermost vertical position, mast 50 releases CRD 104 for installation to the bottom of pressure vessel 10. FIG. 17 shows replacement device 16 after mast assembly 102 released CRD 104 (FIGS. 13 to 16). Carousel 14 may then be rotated and/or cart 60 may be moved along tracks 32 (FIGS. 3 to 5) of channel 24 to a position of another used CRD 12 in pressure vessel 10 (FIG. 1) so that lower mast assembly 102 may receive used CRD 12, as shown in FIG. 18.

Figure 20:
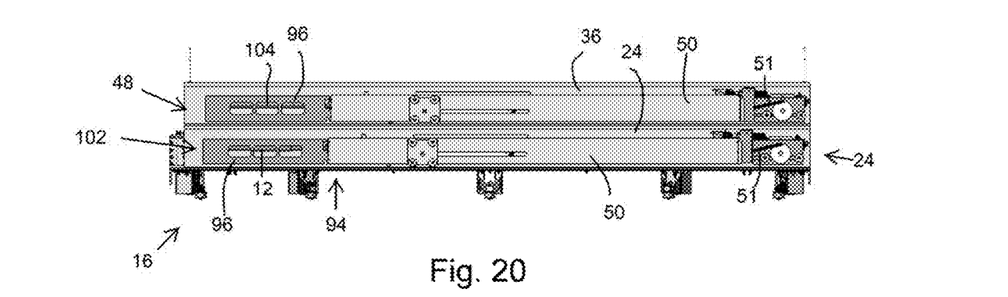
Figure 21:
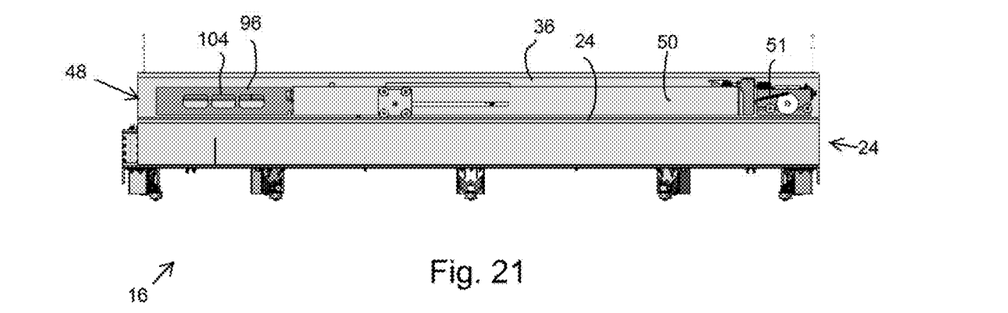

Then, as similarly discussed above and as shown in FIG. 19, lower mast assembly 102, holding the used CRD 12, is pivoted into the horizontal position by winch 64 pulling in cables 51 and mast extension 96 is placed over the portion of CRD 12 protruding past longitudinal end 94 of lower mast 50. Next, as shown in FIGS. 20 and 21, the process described with respect to FIGS. 13 and 14 is repeated. Upper mast assembly 48 is provided with a new CRD 104 and loaded into upper channel 36, then lower mast assembly 102 including the used CRD 12 is removed from lower channel 24. The process may then be repeated as many times as necessary to replace each of the used CRDs 12 with a new CRD 104.

Figures 22A, 22B:
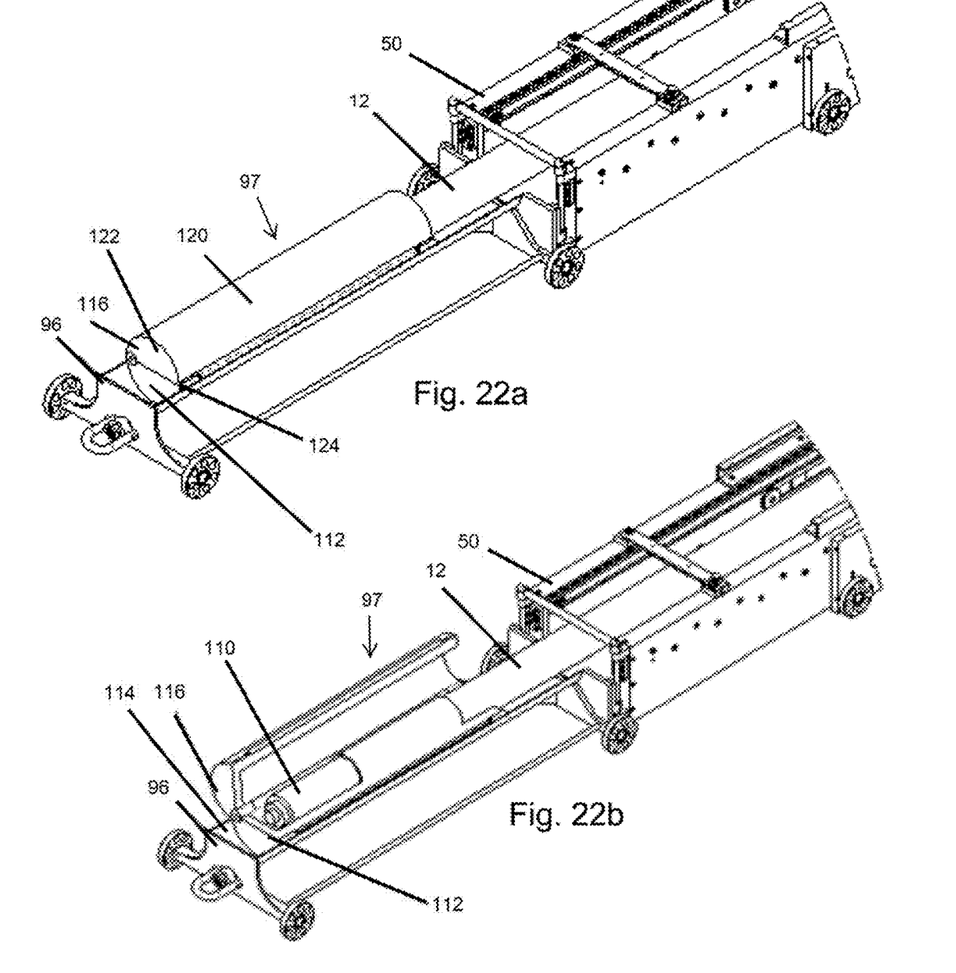
FIGS. 22a and 22b illustrate the opening and closing of a radiation shield in accordance with an embodiment of the CRD removal device to secure the radiation shield onto a CRD 12.
Figure 23A:
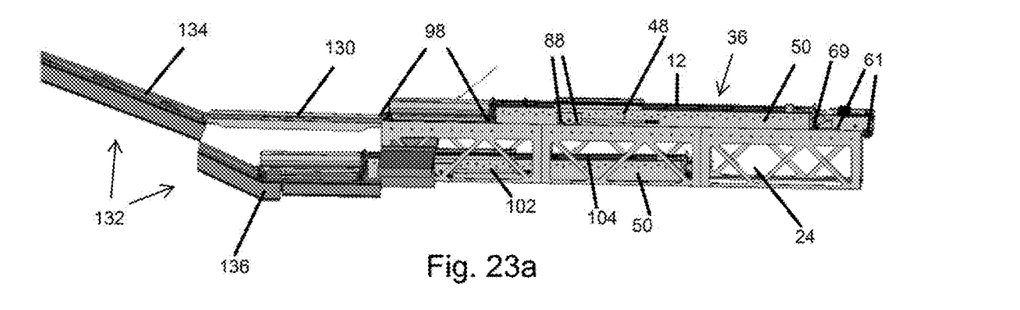
FIGS. 23a to 23c illustrate an extension ramp coupled to an axial end 132 of a first channel of the CRD removal device.
Figure 23B:
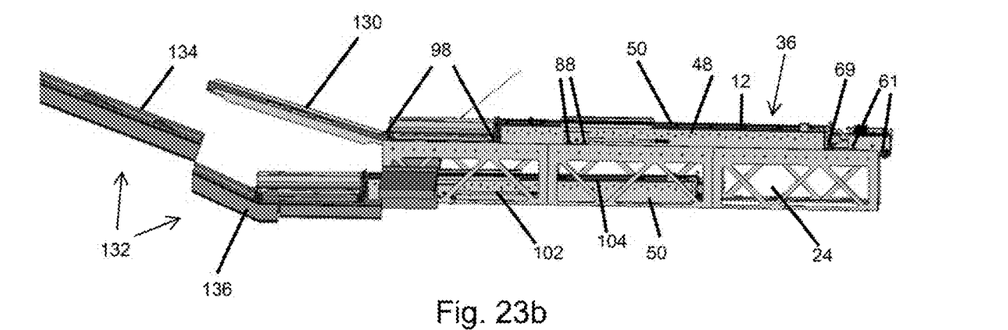
Figure 23C:
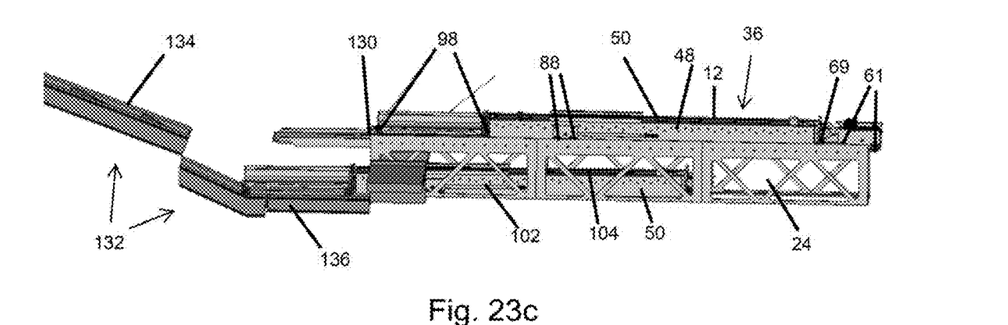

FIGS. 22a and 22b illustrate the opening and closing of radiation shield 97 to secure radiation shield 97 onto CRD 12, with FIG. 22a showing radiation shield 97 in a closed configuration and FIG. 22b showing radiation shield 97 in an open configuration. As similarly described above, radiation shield 97 is configured to fit over and cap an axial end 110 of CRD 12 (i.e., the upper axial end when CRD 12 in the reactor). Axial end 110 has the highest level of radiation of CRD 12 because it was positioned closest to the reactor core during use, and thus the handling of axial end 110 requires particular caution. In order to prevent workers from having to manually place radiation shield 97 onto CRD 12, radiation shield 97 is formed as two pieces that are hinged together. More specifically, radiation shield 97 includes a base or bottom semi-cylindrical section 112 supported by a cylindrical base 114 of mast extension 96 and a lid or top semi-cylindrical section 116 that is connected to bottom section 112 by a longitudinally extending hinge 118. Top section 116 closes on top of bottom section 112 to form a cylindrical surface 120 and an end surface 122 closing the cylindrical surface 120 at one axial end. In one preferred embodiment, radiation shield 97 is self-closing—it is formed such that when radiation shield 97 is supported in mast extension 96 within the respective channel 24, 36 (FIGS. 4, 13) in the open configuration, top section 116 automatically closes onto bottom section 112 when axial end 110 of CRD 12 is lowered into bottom section 112 from the vertical to the horizontal orientation. In one embodiment, top section 116 is formed as a spring loaded lid and/or with a finger on an internal face of top section 116, the finger being on the path of axial end 110 of CRD 12 when CRD 12 goes from the vertical orientation to the horizontal orientation, thus closing lid 112. Radiation shield 97 may also include a lock 124 for locking lid 112 onto base 116 in the closed configuration.

FIGS. 23a to 23c illustrate an extension ramp 130 coupled at an axial end 132 of first channel 36, the side walls of which are omitted for clarity. Extension ramp 130 is configured for selectively bridging a gap between a leveling tray 132 arranged for at least one of removing the mast assembly 48 from channel 36 when mast 50 of mast assembly 48 is holding CRD 12 and supplying the mast assembly 48 to channel 36 when mast 50 of mast assembly 48 is holding a new CRD. Leveling tray 132 is provided to connect the under vessel area including removal device 16 (FIGS. 1, 8 to 21) to a platform, which is vertically higher than the under vessel, where workers performed exchange of CRDs. At the level of the platform, there is a door in a biological shield formed by a wall supporting the reactor. Leveling tray 132 includes a rotatable upper section 134 hinged at the door at one end and a lower section 136 formed of structural steel that is permanently affixed to a containment building housing the pressure vessel. Upper section 134 is configured for being raised and lowered such that the other end of upper section 134, which is opposite the hinged end, is selectively alignable in a first position which is shown in FIG. 23a and in a second position in which upper section 134 is in alignment with lower section 136. When extension ramp 130 is in the position shown in FIG. 23a, mast assembly 48 may be rolled out of channel 36 via wheels 61, 69, 88, 98 along extension ramp 130 to an upper section 134 of leveling tray 132. Leveling tray 132 is also arranged for at least one of removing the mast assembly 102 from channel 24 when mast 50 of mast assembly 102 is holding a used CRD and supplying the mast assembly 102 to channel 24 when mast 50 of mast assembly 102 is holding new CRD 104. Lower section 136 is arranged and configured for supplying and removing of CRDs from lower channel 24 when upper section is aligned with lower section 136.

In order to prevent extension ramp 130 from blocking the supplying or removing of CRDs from lower channel 24, extension ramp 130 may be movably coupled to lower channel 24 and/or upper channel 36. FIG. 23b shows extension ramp 130 being rotatably coupled at the axial end of upper channel 36 to lower channel 24 by for example a hinge such that extension ramp 130 is rotatable away from leveling tray 132. FIG. 23c shows extension ramp 130 slidably coupled at the axial end of upper channel 36 to lower channel 24, by for example tracks and rollers in lower channel 24, such that extension ramp 130 is slidable away from leveling tray 132 into channel 24. In another embodiment, extension ramp 130 is removably coupled at the axial end of upper channel 36 to lower channel 24 and is manually removed and supplied to remove mast assembly 48 from upper channel 36. In further embodiments, extension ramp 130 may be hinged to or slidably connected to upper section 134.

In the preceding specification, the invention has been described with reference to specific exemplary embodiments and examples thereof. It will, however, be evident that various modifications and changes may be made thereto without departing from the broader spirit and scope of invention as set forth in the claims that follow. The specification and drawings are accordingly to be regarded in an illustrative manner rather than a restrictive sense.

What is claimed is:

1. A control rod drive replacement device comprising:
a channel for mounting on a support under a nuclear reactor pressure vessel;
a control rod drive extractor removably received in the channel, the control rod drive extractor including a base and a housing pivotably connected to the base, the housing configured for receiving a control rod drive, the base including a base axis, the housing being pivotably attached to the base at the base axis for pivoting between a horizontal orientation in which the housing is aligned within the channel and a vertical orientation in which the housing is aligned for receiving the control rod drive from the nuclear reactor pressure vessel, the housing being vertically movable with respect to the base in the vertical orientation;
a second channel connected on top of the channel under the nuclear reactor pressure vessel; and
a second control rod drive extractor removably received in the second channel, the second control rod drive extractor including a second housing configured for receiving a second control rod drive, the second housing being movable between a horizontal orientation in which the second housing is aligned within the second channel and a vertical orientation in which the second housing is aligned for receiving the second control rod drive from the nuclear reactor pressure vessel.

2. The control rod drive replacement device as recited in claim 1 further comprising an extension ramp coupled to an axial end of the channel, the extension ramp configured for selectively bridging a gap between a leveling tray arranged for at least one of removing the housing and control rod drive from the channel and supplying the housing and a new control rod drive to the channel, the leveling tray arranged for at least one of removing the second housing and second control rod drive from the second channel and supplying the second housing and a new second control rod drive to the second channel.

3. A method replacing a control rod drive in a nuclear reactor pressure vessel comprising:
providing a control rod drive replacement device comprising:
a channel for mounting on a support under a nuclear reactor pressure vessel;
a control rod drive extractor removably received in the channel,
the control rod drive extractor including a base and a housing pivotably connected to the base, the housing configured for receiving a control rod drive,
the base including a base axis,
the housing being pivotably attached to the base at the base axis for pivoting between a horizontal orientation in which the housing is aligned within the channel and a vertical orientation in which the housing is aligned for receiving the control rod drive from the nuclear reactor pressure vessel,
the housing being vertically movable with respect to the base in the vertical orientation;
a second channel connected to the channel; and
a second control rod drive extractor removably receivable in the second channel,
the second control rod drive extractor including a second housing configured for receiving a replacement control rod drive,
the second housing being movable between horizontal and vertical orientations;
providing the channel onto the support below the nuclear reactor pressure vessel;
moving the housing from the horizontal orientation in which the housing is aligned within the channel to the vertical orientation;
receiving the control rod drive within the housing while the housing is in the vertical orientation;
moving the housing from the vertical orientation to the horizontal orientation while the control rod drive is within the housing;
removing the housing with the control rod drive from the channel;
movably mounting the second housing including a replacement control rod drive therein inside the second channel;
moving the second housing and the replacement control rod drive from a horizontal orientation to a vertical orientation; and
providing the replacement control rod drive from the second housing into the nuclear reactor pressure vessel while the second housing is in the vertical orientation.

4. The method as recited in claim 3 wherein the movably mounting the second housing including the replacement control rod drive therein inside the second channel is performed before the removing the housing and the control rod drive from the channel.

5. The method as recited in claim 4 wherein the moving the second housing and the replacement control rod drive from a horizontal orientation to a vertical orientation is performed after the removing the housing and the control rod drive from the channel.

6. The method as recited in claim 3 further comprising moving the housing vertically upward after the moving the housing from the horizontal orientation to the vertical orientation.

7. The method as recited in claim 6 further comprising providing a trunnion mount pivotably attaching the housing to the channel.

8. The method as recited in claim 7 wherein the housing includes an elongated slot extending longitudinally therein, the trunnion mount including a protrusion extending into the elongated slot, the moving the housing vertically upward including moving the protrusion vertically upward in the elongated slot.

9. The method as recited in claim 8 wherein the moving the housing from the horizontal orientation to the vertical orientation includes pivoting the protrusion while the protrusion contacts an end stop edge of the slot.

10. A control rod drive replacement device comprising:
a channel for mounting on a support under a nuclear reactor pressure vessel;
a control rod drive extractor removably received in the channel, the control rod drive extractor including a base and a housing pivotably connected to the base, the housing configured for receiving a control rod drive, the base including a base axis, the housing being pivotably attached to the base at the base axis for pivoting between a horizontal orientation in which the housing is aligned within the channel and a vertical orientation in which the housing is aligned for receiving the control rod drive from the nuclear reactor pressure vessel, the housing being vertically movable with respect to the base in the vertical orientation, the control rod drive extractor including at least one support housed inside of the housing, the at least one support configured for restraining the control rod drive in the housing while the housing is rotating from the horizontal orientation to vertical orientation and while the housing is in the vertical orientation, the control rod drive extractor including an actuator configured for pivoting the housing about the base axis to move the housing between the horizontal orientation and the vertical orientation, the actuator configured for moving the housing vertically in the vertical orientation to move the housing vertically with respect to the base axis.

11. The control rod drive replacement device as recited in claim 10 wherein the control rod drive extractor includes a lead screw driven by a motor for assisting the housing in receiving the control rod drive when the housing is in the vertical orientation.

12. The control rod drive replacement device as recited in claim 10 wherein the actuator includes a winch configured for moving the housing between the horizontal orientation and the vertical orientation and configured for moving the housing vertically in the vertical orientation.

13. The control rod drive replacement device as recited in claim 10 wherein the at least one support includes a lower support for contacting a lower end of the control rod drive, the housing being arranged and configured such that when the lower end of the control rod drive contacts the lower support the control rod drive extends longitudinally past a longitudinal end of the housing.

14. The control rod drive replacement device as recited in claim 13 further comprising a mast extension connectable to the longitudinal end of the housing, the mast extension arranged and configured for surrounding a portion of the control rod drive extending longitudinally past the longitudinal end of the housing.

15. The control rod drive replacement device as recited in claim 14 further comprising a radiation shield supported by the mast extension, the radiation shield including a top section configured for closing onto a bottom section at an axial end of the control rod drive when the control rod drive is lowered into the horizontal position in the channel.

16. The control rod drive replacement device as recited in claim 10 wherein the base is a trunnion assembly pivotably coupling the housing to the channel and defining the base axis, the housing sliding along the trunnion assembly during vertical movement of the housing in the vertical orientation.

17. The control rod drive replacement device as recited in claim 16 wherein the housing includes an elongated slot extending longitudinally therein and the trunnion assembly includes a protrusion defining the base axis, the protrusion extending into the elongated slot and sliding along the elongated slot during vertical movement of the housing in the vertical orientation.

18. The control rod drive replacement device as recited in claim 10 further comprising a cart horizontally movable in the channel, the actuator being fixed to the cart for horizontal movement in the channel with cart.

19. The control rod drive replacement device as recited in claim 18 wherein the cart includes clamps for clamping the housing in the horizontal orientation and the vertical orientation.

20. The control rod drive replacement device as recited in claim 10 further comprising a second actuator configured for moving the at least one support vertically when the housing is in the vertical orientation.

\* \* \* \* \*